(12) United States Patent
Nagai et al.

(10) Patent No.: US 7,573,231 B2
(45) Date of Patent: Aug. 11, 2009

(54) RECHARGING TERMINAL

(75) Inventors: Kenji Nagai, Tokyo (JP); Yoshihiro Matsuyama, Tokyo (JP); Masakatsu Shimada, Tokyo (JP); Masaya Fujino, Tokyo (JP); Akio Shogen, Tokyo (JP)

(73) Assignee: Uniden Corporation, Tokyo (JP)

( * ) Notice: Subject to any disclaimer, the term of this patent is extended or adjusted under 35 U.S.C. 154(b) by 1127 days.

(21) Appl. No.: 10/745,415

(22) Filed: Dec. 23, 2003

(65) Prior Publication Data

US 2005/0141701 A1 Jun. 30, 2005

(51) Int. Cl.
*H02J 7/00* (2006.01)
(52) U.S. Cl. ..................................... 320/111
(58) Field of Classification Search ................. 439/848, 439/593, 366; 320/113; 379/433.01, 433.07, 379/433.08; 455/573, 572, 90
See application file for complete search history.

(56) References Cited

U.S. PATENT DOCUMENTS 5,030,902 A * 7/1991 Mattinger et al. ........... 320/114
5,052,943 A * 10/1991 Davis .......................... 439/357
5,473,242 A * 12/1995 McKenna .................... 320/113
5,664,973 A * 9/1997 Emmert et al. .............. 439/862
6,044,281 A * 3/2000 Shirai ........................... 455/573
6,554,640 B1 * 4/2003 Koike et al. .................. 439/500

FOREIGN PATENT DOCUMENTS

JP 05-122313 5/1993

* cited by examiner

*Primary Examiner*—Alexander Gilman
(74) *Attorney, Agent, or Firm*—Steven J. Hultquist; Intellectual Property/Technology Law

(57) ABSTRACT

Provided is an interterminal connection structure capable of eliminating the precipitate adhering to the terminal with the installation operation, securing the electrically connected state of the terminal between a pair of members, and easily accommodating to design changes in the spring load. In a cordless handset of a domestic telephone, the conductive state of the terminals employed in the electrical connection between this cordless handset and battery charger is made to contact in a mutually intersecting manner, and, in addition, the terminal on the battery charger side is made to rotate and move pursuant to the installation operation of the cordless handset, and the contact position is gradually moved while maintaining this contact state via such rotating movement. Thus, even if there is a precipitate on the terminals, such precipitate will be chipped off due to the contact movement (sliding), and a loose connection can thereby be prevented.

15 Claims, 6 Drawing Sheets

RECHARGING TERMINAL

BACKGROUND OF THE INVENTION

1. Technical Field of the Invention

The present invention pertains to an interterminal connection structure constituting a terminal that is provided respectively to a detachable pair of members and which is electrically connected when such pair of members is installed.

2. Description of the Related Art

Conventionally, a domestic telephone unit comes with a base unit and a plurality of cordless handsets. Since a cordless handset is able to perform wireless transmission and reception with the base unit, a telephone call may be made from any room in a general household. In other words, a base unit may be set up in a particular room in which a telephone line connection terminal is wired, and a cordless handset may be permanently installed in a desired room without requiring any wiring.

A cordless handset is equipped with a battery pack, and this battery pack may be installed in a battery charger included together with the cordless handset for recharging. A battery charger is structured from a main body and a plug cord to be connected to a domestic outlet, and the main body is provided with an installation unit for detachably retaining the cordless handset. Further, the battery charger also functions as a cradle, and will be the installation location of the cordless handset upon permanently installing such cordless handset in a desired room.

A terminal for connecting with the terminal on the cordless handset side is exposed from the installation unit, and, in a normal installation state, the mutual terminals become connected to enable recharging.

Conventionally, a terminal (usually two terminals) on the battery charger side is of a flat spring shape, and, for instance, one end of the flat spring is bent into an approximate L shape, and the apex thereof is made to be the contact point of the cordless handset and the terminal, and the other end is used to perform so-called cantilevered support. Moreover, the other end of the flat spring is electrically connected with the likes of a solder to a recharging circuit substrate built in the battery charger. When the cordless handset is installed to the installation unit in the foregoing state, the load of the cordless handset will fall on the flat spring, and the flat spring will elastically deform pursuant to this load. The restoration force of this elastic deformation will become the biasing force, increase the contact pressure with the terminal on the cordless handset side, and secure the electrical connection thereof.

Incidentally, a structure has been proposed for making flat plate terminals such as the foregoing flat springs contact each other in a mutually intersecting manner (c.f. Patent Document 1).

Nevertheless, with the terminal of the cordless handset and the terminal of the battery charger, even though the cordless handset is moved for installation in the installation unit, the terminals are almost constantly placed in the same location, and there are cases where the contact site will erode due to prolonged use.

Further, the terminal on the cordless handset side is positioned on the bottom face or back face of the cordless handset, and, by the user touching this terminal, perspiration of the user may adhere thereto, solidify, and cause precipitation. In some cases, erosion may also occur. When the contact area is the same as described above, the precipitated portion or eroded portion may hinder the conduction, and, in the worst-case scenario, recharging may not be possible.

Moreover, with the terminal structure employing a flat spring, although it is possible to reduce the unit price of components with mass production, when there is a design change in the spring load or the like, the flat spring itself must be newly replaced, and this must be newly manufactured from a metal mold.

SUMMARY OF THE INVENTION

In consideration of the foregoing facts, an object of the present invention is to provide an interterminal connection structure capable of eliminating the precipitate adhering to the terminal with the installation operation, securing the electrically connected state of the terminal between a pair of members, and easily accommodating to design changes in the spring load.

The present invention provides an interterminal connection structure constituting a terminal that is provided respectively to a detachable pair of members and which is electrically connected when the pair of members is installed, wherein at least the contact site of each terminal in the pair of members is respectively formed with a wire; the interterminal connection structure comprising: guiding means for guiding the relative displacement of the pair of members such that the pair of wires will relatively contact in an intersecting state when the pair of members is installed; and biasing means which is relatively displaced by being guided with the guiding means, and which maintains the mutual connection state in relation to the further displacement of the contact direction after the contact of the pair of wires begins; wherein the contact position with the other conductive wire in contact in the intersecting state is gradually displaced in the axis line direction of one wire as a result of the axis line angle of the one wire changing due to the relative displacement resisting the biasing force of the biasing means.

According to the present invention, when the pair of members is relatively displaced in a mutually approaching direction by being guided with the guiding means, the respective terminals will mutually intersect and contact each other. When displacement is continued after the start of this contact, the contact between the wires will be maintained due to the biasing force of the biasing means.

Here, since the axis line angle of one wire will change, the contact position with the other wire in contact in an intersecting manner will gradually be displaced toward the axis line direction of such one wire. As a result of this displacement, the contact positions will mutually be in friction, and, for instance, the precipitate hindering the conduction will be chipped off. This friction (sliding) will take place each time the pair of members is attached or detached, and the conduction of the contact sites can be retained thereby.

Further, in the present invention, at least a circular portion is provided to the outer periphery of the cross section perpendicular to the axis of the wire, and the circular portions are made to be the contact site.

Since the contact sites are mutually formed of circular faces, this will realize a point contact, and the contact state can be maintained even if the axis line angle of one wire changes upon the sliding described above.

Moreover, in the present invention, one terminal is of a torsion coil screw structure doubling as the biasing means, one of the coil portions extending from the coil portion toward the wire direction is employed as the terminal, and the axis line of the one terminal inclines as a result of the coil portion of the torsion coil screw rotating as the rotational axis.

When one terminal is subject to pressing force, the torsion coil screw will deform, and the restoration force thereof will become the biasing force. Here, the coil portion is the center of rotation of the biasing force, and, since one terminal is at a position extended from this coil portion toward the tangent line direction, in one terminal, the axis line direction will incline.

Further, in the present invention, the guiding means is structured from a convex portion or concave portion formed on one member and in which the one terminal is correspondingly disposed thereto, and a concave portion or convex portion formed on the other member and in which the other terminal is correspondingly disposed thereto, and at least one pair of the combination of the convex portion and concave portion is provided.

As a result of engaging at least a pair of convex portion and concave portion, this will realize at the least a two-point support, and the positioning of the pair of members will be enabled. By disposing the respective terminals corresponding to this convex portion and concave portion, interterminal connection will be enabled simultaneously with the installation operation of the pair of members.

Moreover, in the present invention, one of the pair of members is a cradle-shaped battery charger, and the other of the pair of members is a wireless telephone equipped with a battery rechargeable through conduction from the battery charger.

The telephone unit is detachable in relation to the battery charger, and, when the telephone unit is installed to the battery charger, the telephone unit is retained and recharging of the battery is enabled due to the interterminal contact.

The present invention also provides a recharging structure for installing a recharging terminal to a battery charger and recharging the recharging terminal, wherein the recharging terminal of the battery charger and the rechargee terminal of the recharging terminal are respectively structured from a wire, and the recharging terminal and rechargee terminal are disposed such that both wires will intersect and contact each other when the recharging terminal is installed to the battery charger. Another mode of the present invention provides a recharging structure for installing a recharging terminal to a battery charger and recharging the recharging terminal, wherein the contact point of the recharging terminal of the battery charger and the rechargee terminal of the recharging terminal is structured from a point contact. In addition, the present invention further provides a conversation device formed from a battery charger and a hand phone, wherein the connection structure described above is employed in the terminal of the battery charger and the terminal of the hand phone.

DETAILED DESCRIPTION OF THE PREFERRED EMBODIMENTS

Figure 1:
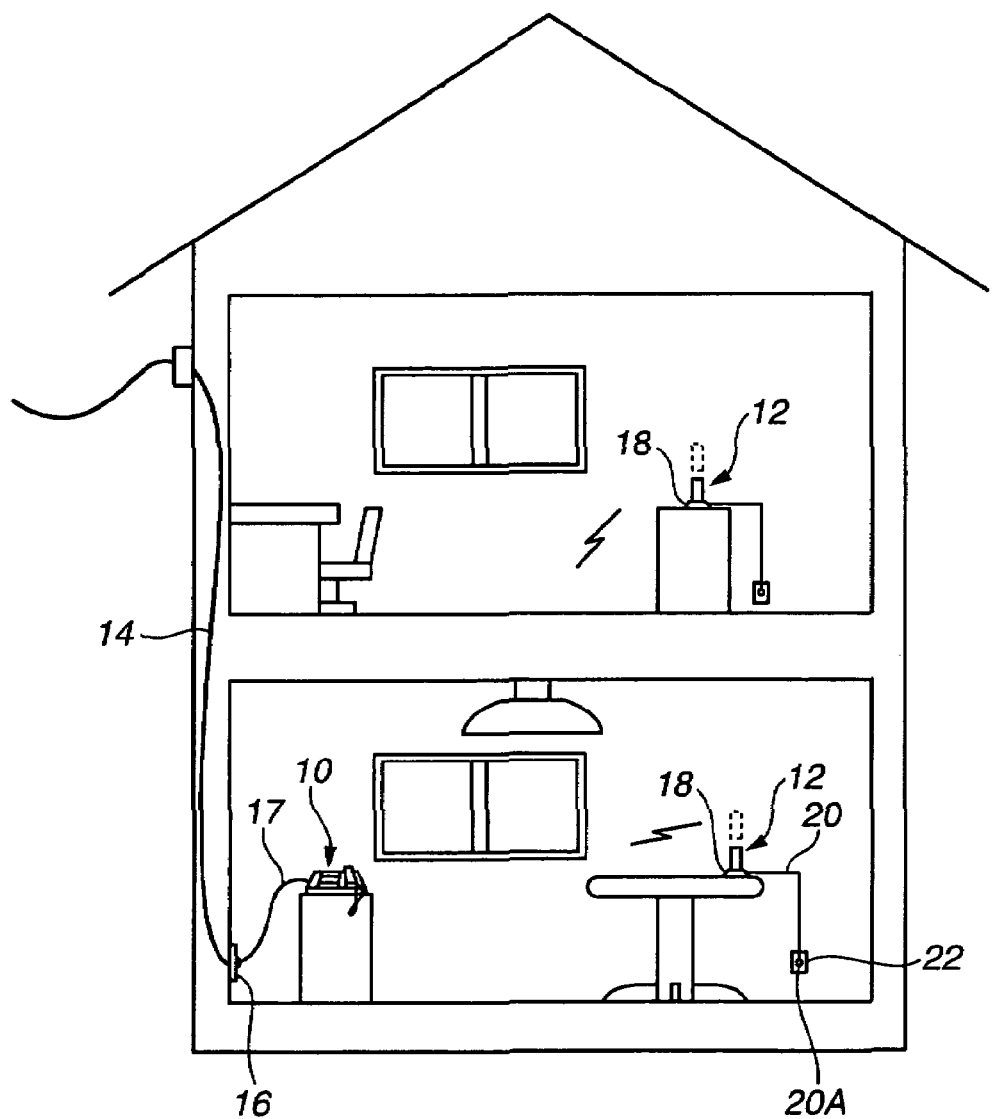
FIG. 1 is a schematic diagram of the domestic telephone system showing the layout of the telephone units in a general household.
Figure 2:
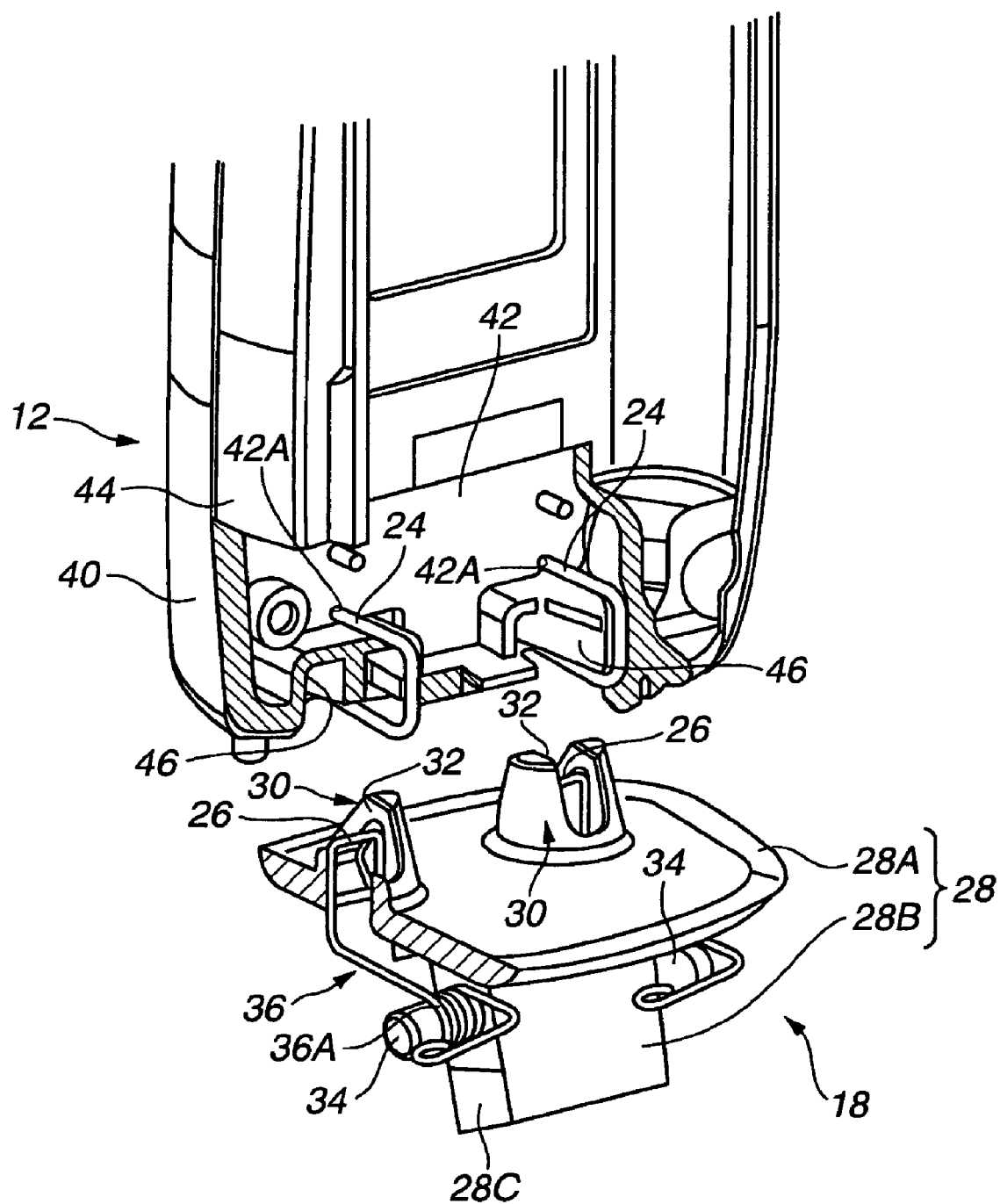
FIG. 2 is a perspective view showing the installation state of the battery charger and cordless handset (uninstalled state)
Figure 3:
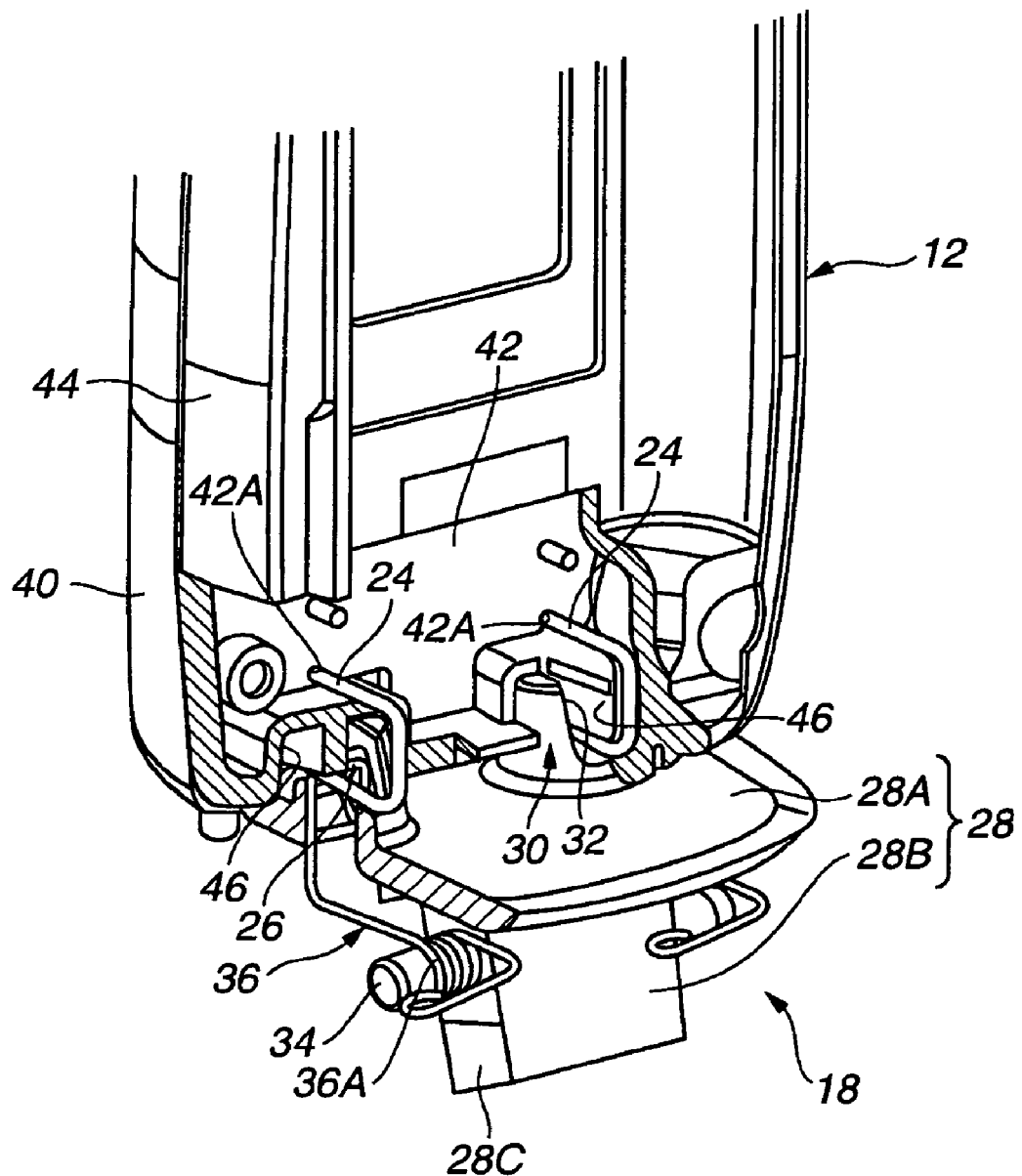
FIG. 3 is a perspective view showing the installation state of the battery charger and cordless handset (installed state)
Figure 4:
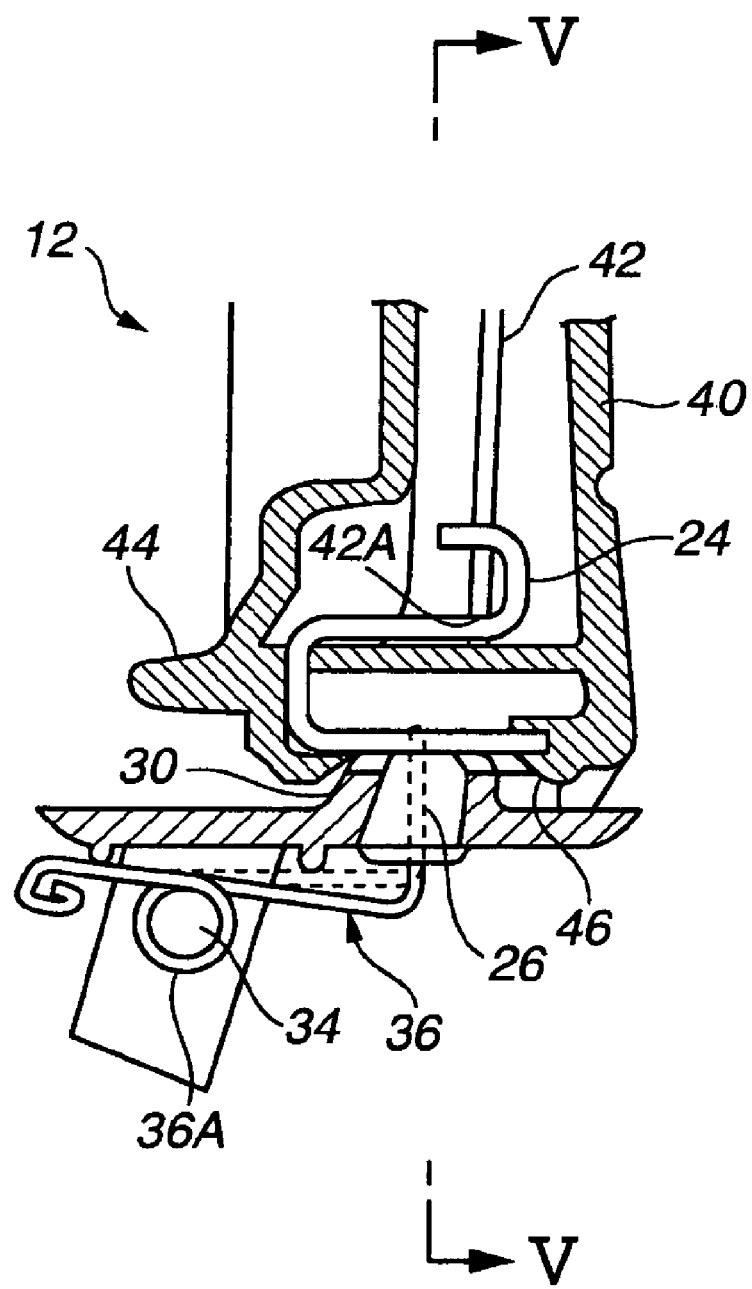
FIG. 4 is a cross section along line IV-IV of FIG. 5 showing the terminal structure of the battery charger and cordless handset.
Figure 5:
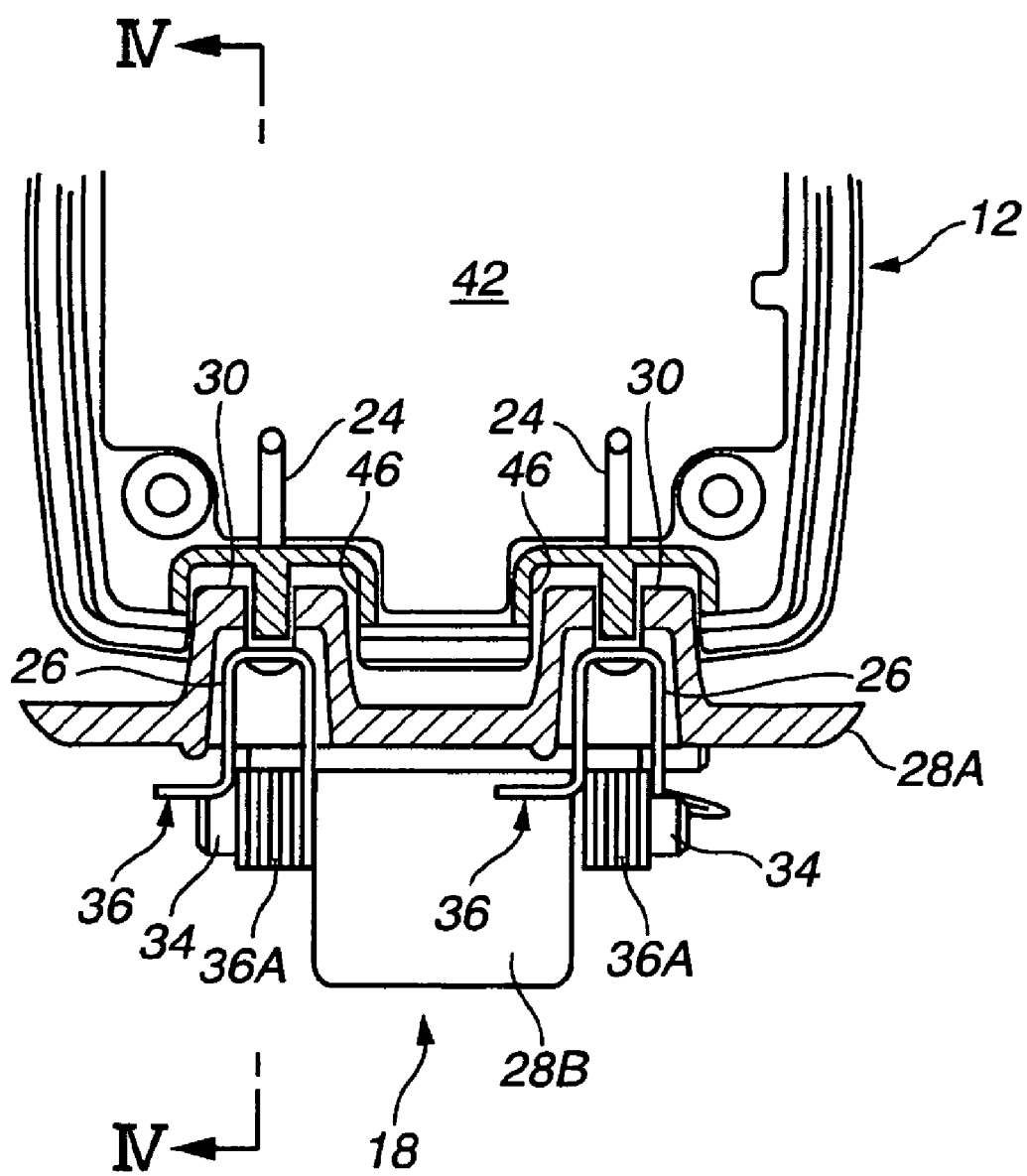
FIG. 5 is a cross section along line V-V of FIG. 4 showing the terminal structure of the battery charger and cordless handset.

FIG. 1 shows a domestic telephone system pertaining to the present embodiment. The domestic telephone system is structured from one base unit 10 and a plurality of cordless handsets 12, and the base unit 10 enables communication by being wired, via an exclusive cord 17, with a terminal 16 of the telephone line 14 pre-wired in a residential building.

Meanwhile, the cordless handset 12 is capable of wireless communication between the base unit 10, and, irrespective of the telephone line 14 and terminal 16 in the residential building, it may be installed at a desired position in the home.

A battery charger 18 is provided to the cordless handset 12 as a set, and this battery charger 18 functions as a cradle. Thus, when the cordless handset 12 is not being used, it is possible to retain the cordless handset 12 by installing it to the installation unit of this battery charger 18.

A plug 20A connectable to a domestic outlet 22 via an electric wire 20 is provided from the battery charger 18, and, in a state where this plug 20A is connected to the outlet 22, the battery (not shown) within the cordless handset 12 is recharged when the cordless handset 12 is installed to the installation unit.

In other words, a terminal 26 (c.f. FIG. 2 to FIG. 5) to be electrically connected to a terminal 24 on the cordless handset 12 side (c.f. FIG. 2 to FIG. 5) is exposed from the installation unit, and the terminals 24, 26 contact each other and are energized upon installation.

FIG. 2 to FIG. 5 are enlarged views of the electrical connection between the battery charger 18 and the cordless handset 12. Foremost, the terminal structure on the battery charger 18 side is explained.

As shown in FIG. 2 to FIG. 5, a support plate 28 for supporting the cordless handset 12 when such cordless handset 12 is installed is provided to the top face of the battery charger 18. This support plate 28 is structured from a support unit 28A of a thin flat plate shape, and a rectangular reinforcing block 28B formed integrally on the back face (bottom face) side of the support unit 28A.

A pair of convex portions 30 is formed on the support unit 28A of the support plate 28. This pair of convex portions 30 is of an approximate circular cone shape, and is of a tapered shape in which the diameter measurement of the cross section gradually becomes smaller in accordance with the degree of protrusion from the top face of the support unit 28A.

Moreover, an approximate U-shaped notch portion 32 is respectively formed from the top face toward the peripheral face of the pair of convex portions 30. As a result of this notch portion 32, the top face of the convex portion 30 will be divided into two, and the top face and bottom face of the support 28A will be in communication.

The terminal 26 electrically connected to the recharging substrate not shown provided to the battery charger 18 is exposed from this communicating notch portion 32.

This terminal 26 is disposed by being extended in the tangent line direction from one end of the wire forming the coil portion 36A of the torsion coil screw 36 mounted to the boss axis 34 formed on the mutually opposing side faces 28C of the reinforcing block 28B described above. The terminal 26 extending from this coil portion 36A is bent three-dimensionally.

In other words, the terminal 26 is foremost extended in the tangent line direction (in the parallel direction in relation to the support unit 28A) from the coil portion 36A, and thereafter bent approximately 90° toward the support unit 28A and then reaches the notch portion 32. Further, the terminal 26 is bent to be parallel with the support unit 28A within the notch portion 32, disposed so as to be placed across the top face of the convex portion 30 divided into two, thereafter bent approximately 90° toward the bottom face of the support unit 28A, and then bent approximately 90° so as to be placed along the bottom face at such bottom face side of the support unit 28A. Incidentally, the other terminal is also similarly bent three-dimensionally in a symmetrical manner.

In addition, the other end of the wire forming the coil portion 36 is extended in a direction 180° opposite to the extending direction of the terminal, and is stopped at a prescribed position at the bottom face side of the support unit 28A.

Figure 6A:
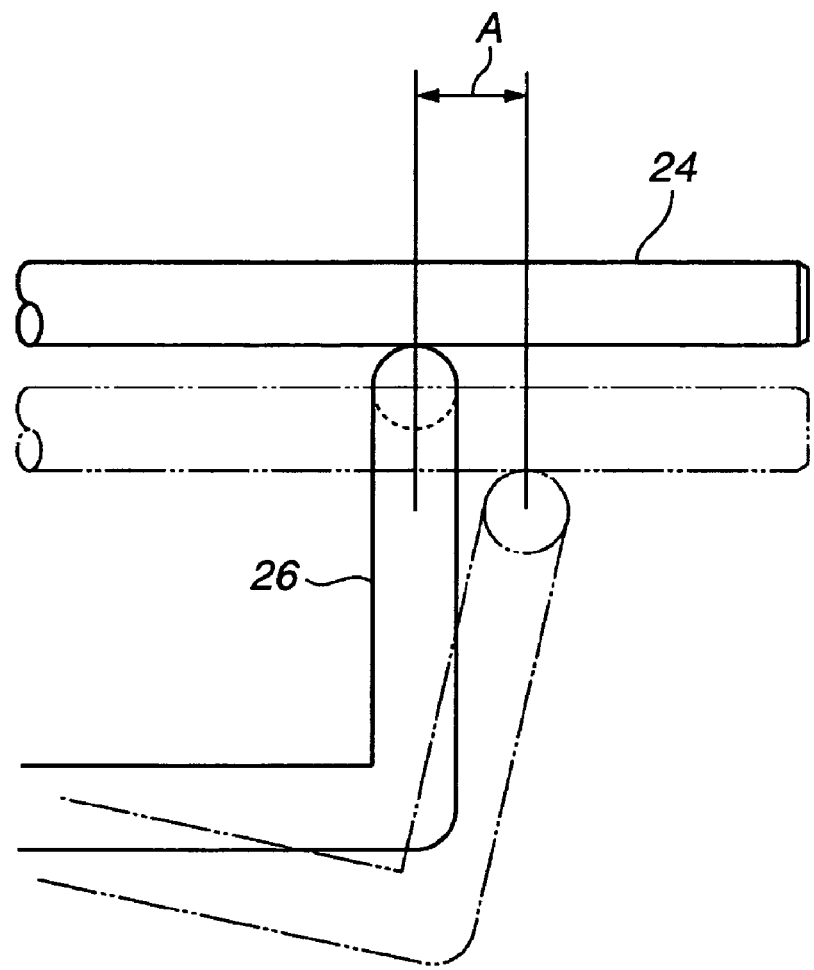
FIG. 6(A) is an enlarged view showing the contact state of the terminal.
Figure 6B:
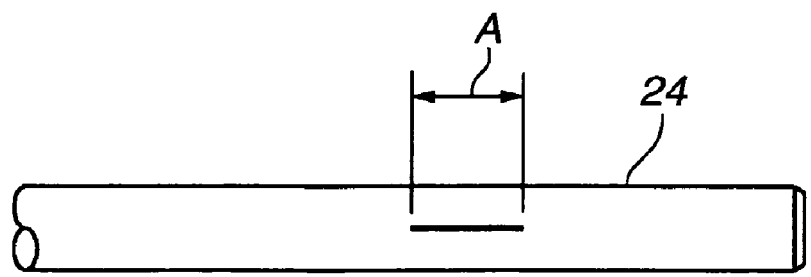
FIG. 6(B) is a top view of FIG. 6(A).

As a result, when the terminal 26 exposed from the notch portion 32 is pressed, in resilience to the biasing force of the torsion coil screw 36, the terminal 26 will rotate around the boss axis 34 of the coil portion 36A. As a result of this rotation, the axis line angle of the terminal 26 will change (c.f. FIG. 6).

Next, the terminal structure on the cordless handset 12 side to be a pair with the battery charger 18 is explained.

As illustrated in FIG. 2 to FIG. 5, the external appearance of the cordless handset 12 is structured from a front cover 40 provided with openings for exposing the microphone, earpiece, operation key, display unit and so on; and a back cover 44 to which are fixed electronic components such as the microphone, earpiece, operation key and display unit as well as a substrate 42 for controlling such electronic components being mutually joined.

A pair of concave portions 46 corresponding to the pair of convex portions 30 described above is formed at the bottom face (face facing the battery charger 18 upon installation) of the back cover 44.

The other end of the terminal 24, in which one end thereof is connected (electrically connected with the likes of a solder) to the substrate 42, is respectively disposed on the pair of concave portions 46. This pair of terminals 24 has a cross section of an approximately circular wire, and is generally bent two-dimensionally in an approximate S shape.

In other words, one end of the terminal 24 is inserted into and soldered to the mounting hole of the substrate 42. The terminal 24 extends perpendicular to the substrate 42 from the soldered position, and thereafter faces the substrate 42 by making a U-turn. This direction is the edge portion of the substrate 42, and an approximate U-shaped notch portion 42A is formed on such edge portion, and the terminal 24 is able to pass through the notch portion 42A. As a result, the terminal 24 will be retained by the substrate at two positions; namely, the soldered position and the position of being engaged with the notch portion 42A, and displacement such as rotation or the like is thereby limited.

The terminal 24 that is passed through the notch portion 42A is bent in an approximate U shape (bent 90° two times in a row) at a position of contacting the back cover 44, and thereby reaches the concave portion 46. The terminal retainer (not shown) preformed by molding retains the contact site with the back cover 44, and the terminal 24 is thereby reinforced.

With the terminal 24 on the cordless handset 12 side having the foregoing structure, when the cordless hand 12 is installed to the battery charger 18, the pair of convex portions 30 of the battery charger 18 is guided with the pair of concave portions 46 of the cordless handset 12. Thus, even if the relative position of the battery charger 18 and the cordless handset 12 is slightly out of alignment, the relative position will be gradually corrected by the engagement of the convex portion 30 and concave portion 46, and, since this will ultimately become a two-point support, installation will be realized in the predetermined relative positions of the battery charger 18 and cordless handset 12.

Further, in this state of installation, the terminal 24 will contact the terminal 26 on the battery charger 18 side in an intersecting manner of roughly 90°. Thus, this contact will become a point contact since the cross sections of both terminals 24, 26 are of a circular wire.

Moreover, prior to the complete installation of the battery charger 18 and cordless handset 12, this contact is begun, and, pursuant to additional displacement, the terminal 26 on the battery charger 18 side will be pressed by the terminal 24 on the cordless handset 12 side. As a result of this pressure, the terminal 26 on the battery charger 18 side will rotate around the boss axis 34 in resilience to the biasing force of the torsion coil screw 36.

Here, as depicted in FIG. 6, with the terminal 26 on the battery charger 18 side, since the axis line angle will change, the contact point with the terminal 24 on the cordless handset 12 side will gradually become displaced pursuant to the installation movement.

In other words, the terminals 24, 26 maintain the contact state upon installation, and slide in the amount of displacement A shown in FIG. 6. Here, even if a precipitate exists on the contact site of one or both terminals 24, 26, the precipitate will be chipped off due to this sliding, and the electric conduction will be secured thereby.

As the precipitate, it is anticipated that the likes of oil or perspiration from the hand of a user holding the cordless handset 12 will adhere to the terminal 24, and this may solidify thereafter.

The operation of the present embodiment is now explained.

When the telephone call made with the cordless handset 12 is finished, the cordless handset 12 is installed to the battery charger 18 and stored since the battery will run out if the cordless handset 12 is left abandoned.

Here, a pair of convex portions 30 is provided on the support unit 28A of the support plate 28 in the battery charger 18, and a pair of concave portions 46 is provided correspondingly to this convex portion 30 in the cordless handset 12. Thus, the convex portion 30 will fit into the concave portion 46 by the user placing the cordless handset 12 close to and in correspondence with the battery charger 18 in a relatively rough manner, and, thereafter, the battery charger 18 and cordless handset 12 will be installed in predetermined relative positions by being guided with the engagement of the convex portion 30 and concave portion 46.

Here, upon the installation and movement, since the terminal 26 on the battery charger 18 side is correspondingly disposed to the convex portion 30 and the terminal 26 on the cordless handset 12 side is correspondingly disposed to the concave portion 46, respectively, electrical connection is also enabled pursuant to the installation operation.

In other words, by holding the cordless handset 12 and placing it near the battery charger 18, the convex portion 30 fits into the concave portion 46 as described above, and the respective terminals 24, 26 will make contact in an intersecting manner. Installation is incomplete in this contact state, and, when further installation movement is made, since the terminal on the battery charger 18 side is structured as a part of the torsion coil screw 36, the terminal 26 will rotate around the boss axis 34 in resilience to the biasing force of the torsion coil screw 36 as a result of the pressure (load of the cordless handset 12) of this installation movement. That is, the axis line angle of the terminal 26 on the battery charger 18 side will change.

During this time, the contact state of the terminals 24, 26 is maintained, and, at the point when the installation is complete, the terminals 24, 26 may be retained in an electrically energized state with sufficient contact pressure pursuant to the biasing force of the torsion coil screw 36 and the load of the cordless handset 12.

Here, since the terminal 26 on the battery charger 18 side and the terminal 24 on the cordless handset 12 side are mutually in contact in an intersecting manner, the contact state will be maintained even if their positions are slightly out of alignment, and a loose connection will not occur.

Further, since the cross sections of the terminals 24, 26 are respectively formed from a wire, the contact state will be a point contact. Thus, even if the axis line angle of the terminal 26 on the battery charger 18 side changes, the contact surface area will not change, and a stable contact state may be maintained thereby.

Meanwhile, since the cordless handset 12 is used upon being held by a user, if there is oil or perspiration on the user's hand, such oil or perspiration may adhere to the terminal 24. Even on the battery charger 18 side, if it is left abandoned for a long period of time without the cordless handset 12, dust floating in the room may adhere thereto. When precipitates are generated on the terminals 24, 26 as a result of such adhesion of oil or perspiration or the adhesion of dust, the terminals 24, 26 will cause a loose contact, and, in the worst-case scenario, this may lead to inferior conduction and recharging may not be possible.

Thus, in the present embodiment, as described above, the terminal 26 on the battery charger 18 side is made to rotate around the boss axis 34 pursuant to the installation movement. As a result of this rotating movement, with the terminal 26 on the battery charger 18 side, the axis line angle will change. Meanwhile, the terminal 24 on the cordless handset 12 side will be guided by the convex portion 30 and concave portion 46 and move approximately linearly.

As a result, as illustrated in FIG. 6, the point contact position will gradually become displaced (c.f. displacement A shown in FIG. 6) pursuant to the installation movement of the cordless handset 12 to the battery charger 18. Moving while maintaining contact means that the terminals 24, 26 will mutually slide, and, when a precipitate exists in this position, it will be chipped off with this sliding motion, and a loose contact can be prevented thereby.

With the present embodiment described above, in the cordless handset 12 of a domestic telephone, the conductive state of the terminals 24, 26 employed in the electrical connection between this cordless handset 12 and battery charger 18 is made to contact in a mutually intersecting manner, and, in addition, the terminal 26 on the battery charger 18 side is made to rotate and move pursuant to the installation operation of the cordless handset 12, and the contact position is gradually moved while maintaining this contact state via such rotating movement. Thus, even if there is a precipitate on the terminals 24, 26, such precipitate will be chipped off due to the contact movement (sliding), and a loose connection can thereby be prevented.

Further, although the present embodiment exemplified and described the battery charger 18 and cordless handset 12 as the pair of members, this may also be another pair of members that is mutually detachable and which requires an electrical connection upon installation. Some examples are listed below.

(1) Portable phone and its cradle;

(2) Tuner body and monitor unit in a small television in a case where such tuner body and monitor unit are detachable;

(3) Emergency flashlight, and a retention unit that is plugged into and retained by an outlet, and which is for retaining the emergency flashlight;

(4) A personal computer capable of separating an assembly of a keyboard and monitor, and a recording media assembly such as for a CD or flexible disk; and (5) Any other electrical appliance (iron, vacuum cleaner, etc.) in which the main unit and recharging unit are detachable.

The present invention described above yields a superior effect in that it is capable of eliminating the precipitate adhering to the terminal with the installation operation, securing the electrically connected state of the terminal between a pair of members, and easily accommodating to design changes in the spring load.

What is claimed is:

1. An interterminal connection structure comprising:
   a detachably engagable pair of members, including a first member having a first terminal, and including a second member having a second terminal;
   guiding structure arranged to cause the first terminal to contact the second terminal in intersecting relationship upon engagement of said pair of members; and
   a biasing element arranged to apply a biasing force to maintain contact between the first terminal and second terminal upon engagement of the pair of members;
   wherein the connection structure is arranged to cause a portion of the first terminal to slide against a portion of the second terminal in accordance with a swinging motion of the second terminal accompanying an increase in the biasing force upon engagement of the pair of members, wherein the first terminal is arranged to contact the second terminal in intersecting relationship at a contact site, at least a portion of the first terminal comprises a wire, at least a portion of the second terminal comprises a wire, and the first terminal is brought into point-contact with the second terminal at the contact site, and
   wherein the second terminal comprises a torsion coil spring structure constituting said biasing element, with a coiled portion of the torsion coil spring structure attached to a boss, such that the second terminal is biased in a rotational direction using the boss.

2. An interterminal connection structure comprising:
   a detachably engagable pair of members, including a first member having a first terminal, and including a second member having a second terminal;
   guiding structure arranged to cause the first terminal to contact the second terminal in intersecting relationship upon engagement of said pair of members; and
   a biasing element arranged to apply a biasing force to maintain contact between the first terminal and second terminal upon engagement of the pair of members;
   wherein the connection structure is arranged to cause a portion of the first terminal to slide against a portion of the second terminal in accordance with a swinging motion of the second terminal accompanying an increase in the biasing force upon engagement of the pair of members, and
   wherein the second terminal comprises a torsion coil spring structure constituting said biasing element, with a coiled portion of the torsion coil spring structure attached to a boss, such that the second terminal is biased in a rotational direction using the boss.

3. An interterminal connection structure according to claim 2, wherein the second member is embodied in a cradle-shaped battery charger, and the first member is embodied in a wireless telephone equipped with a battery rechargeable through conduction from said battery charger.

4. A conversation device including a battery charger, a hand phone, and the interterminal connection structure according to claim 2, with the first member embodied in the hand phone and the second member embodied in the battery charger.

5. An interterminal connection structure comprising:

a detachably engagable pair of members, including a first member having a first terminal, and including a second member having a second terminal;

guiding structure arranged to cause the first terminal to contact the second terminal in intersecting relationship upon engagement of said pair of members; and a biasing element arranged to apply a biasing force to maintain contact between the first terminal and second terminal upon engagement of the pair of members;

wherein the connection structure is arranged to cause a portion of the first terminal to slide against a portion of the second terminal in accordance with a swinging motion of the second terminal accompanying an increase in the biasing force upon engagement of the pair of members, and wherein said guiding structure comprises a convex portion associated with the first member, and a concave portion associated with the second member.

6. A conversation device including a battery charger, a hand phone, and the interterminal connection structure according to claim 5, with the first member embodied in the hand phone and the second member embodied in the battery charger.

7. An interterminal connection structure according to claim 5, wherein the second member is embodied in a cradle-shaped battery charger, and the first member is embodied in a wireless telephone equipped with a battery rechargeable through conduction from said battery charger.

8. A conversation device including a battery charger, a hand phone, and the interterminal connection structure according to claim 7, with the first member embodied in the hand phone and the second member embodied in the battery charger.

9. An interterminal connection structure according to claim 5, wherein said guiding structure comprises a concave portion associated with the first member, and a convex portion associated with the second member.

10. An interterminal connection structure according to claim 9, wherein the second member is embodied in a cradle-shaped battery charger, and the first member is embodied in a wireless telephone equipped with a battery rechargeable through conduction from said battery charger.

11. A conversation device including a battery charger, a hand phone, and the interterminal connection structure according to claim 9, with the first member embodied in the hand phone and the second member embodied in the battery charger.

12. An interterminal connection structure according to claim 5, wherein the first terminal is arranged to contact the second terminal in intersecting relationship at a contact site, at least a portion of the first terminal comprises a wire, at least a portion of the second terminal comprises a wire, and the first terminal is brought into point-contact with the second terminal at the contact site.

13. An interterminal connection structure according to claim 12, wherein said guiding structure comprises a concave portion associated with the first member, and a convex portion associated with the second member.

14. An interterminal connection structure according to claim 12, wherein the second member is embodied in a cradle-shaped battery charger, and the first member is embodied in a wireless telephone equipped with a battery rechargeable through conduction from said battery charger.

15. A conversation device including a battery charger, a hand phone, and the interterminal connection structure according to claim 12, with the first member embodied in the hand phone and the second member embodied in the battery charger.

* * * * *

UNITED STATES PATENT AND TRADEMARK OFFICE
CERTIFICATE OF CORRECTION

| | |
|---|---|
| PATENT NO. | : 7,573,231 B2 |
| APPLICATION NO. | : 10/745415 |
| DATED | : August 11, 2009 |
| INVENTOR(S) | : Nagai et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1630 days.

Signed and Sealed this

Seventh Day of September, 2010

David J. Kappos
*Director of the United States Patent and Trademark Office*